(12) United States Patent
Omori et al.

(10) Patent No.: US 11,315,086 B2
(45) Date of Patent: Apr. 26, 2022

(54) API CHARGING SYSTEM, API CHARGING MANAGEMENT METHOD, AND API CHARGING PROGRAM

(71) Applicant: SoftBank Corp., Tokyo (JP)

(72) Inventors: Keita Omori, Tokyo (JP); Kohei Kato, Tokyo (JP); Eijiro Hoshi, Tokyo (JP)

(73) Assignee: SoftBank Corp., Tokyo (JP)

( * ) Notice: Subject to any disclaimer, the term of this patent is extended or adjusted under 35 U.S.C. 154(b) by 55 days.

(21) Appl. No.: 16/635,227

(22) PCT Filed: Nov. 1, 2018

(86) PCT No.: PCT/JP2018/040695
§ 371 (c)(1),
(2) Date: Jan. 30, 2020

(87) PCT Pub. No.: WO2019/102814
PCT Pub. Date: May 31, 2019

(65) Prior Publication Data
US 2020/0380478 A1 Dec. 3, 2020

(30) Foreign Application Priority Data
Nov. 22, 2017 (JP) .............................. JP2017-224981

(51) Int. Cl.
*G06Q 20/08* (2012.01)
*G06F 9/54* (2006.01)
(Continued)

(52) U.S. Cl.
CPC .......... *G06Q 20/085* (2013.01); *G06F 9/547* (2013.01); *G06Q 20/145* (2013.01);
(Continued)

(58) Field of Classification Search
None
See application file for complete search history.

(56) References Cited

U.S. PATENT DOCUMENTS

| | | | |
|---|---|---|---|
| 2005/0021471 A1* | 1/2005 | Zlotnick | G06Q 30/06 705/52 |
| 2011/0225074 A1 | 9/2011 | Khosravy et al. | |

(Continued)

FOREIGN PATENT DOCUMENTS

| | | |
|---|---|---|
| JP | 2001-195482 A | 7/2001 |
| JP | 2003-173398 A | 6/2003 |

(Continued)

OTHER PUBLICATIONS

Kevin Sookocheff, How Much is that Going to Cost Anyway? Calculating Cost of Goods Sold, posted Feb. 26, 2017, entire document pertinent, retrieved from https://sookocheff.com/post/architecture/how-much-is-that-going-to-cost/(Year: 2017).*

(Continued)

*Primary Examiner* — Gregory S Cunningham, II
(74) *Attorney, Agent, or Firm* — DLA Piper LLP (US)

(57) ABSTRACT

An API management device includes: a reception unit configured to receive a selection of a charging condition when using an API; a receiver configured to receive a request for the API from the application; a transmitter configured to transmit a response according to the request to the application; and a history storage configured to store a history of the request for the API and the response for each of the applications that use the API. A charging management device includes: a charging condition storage configured to store the charging condition received by the reception unit for each of the applications that use the API when using the API; an acquisition unit configured to acquire information on the history from the history storage; and a determination unit configured to determine a charge value for the application that uses the API based on the charging condition and the information on the history.

21 Claims, 11 Drawing Sheets

(51) Int. Cl.
*G06Q 20/14* (2012.01)
*G06Q 20/40* (2012.01)
*H04L 12/14* (2006.01)

(52) U.S. Cl.
CPC ........ *G06Q 20/405* (2013.01); *H04L 12/1417* (2013.01); *H04L 12/1435* (2013.01)

(56) References Cited

U.S. PATENT DOCUMENTS

| 2015/0029894 | A1* | 1/2015 | Lu ...................... H04L 12/1407 370/259 |
| 2015/0193600 | A1 | 7/2015 | Matsuda |
| 2017/0201850 | A1* | 7/2017 | Raleigh ................ G06F 3/0482 |
| 2017/0255826 | A1 | 9/2017 | Chang et al. |
| 2020/0267008 | A1* | 8/2020 | Chen ...................... H04L 12/14 |

FOREIGN PATENT DOCUMENTS

| JP | 2003-256714 A | 9/2003 |
| JP | 2005-032272 A | 2/2005 |
| JP | 2005-094495 A | 4/2005 |
| JP | 2007-233480 A | 9/2007 |
| JP | 2007-316742 A | 12/2007 |
| JP | 2009-116865 A | 5/2009 |
| JP | 2015-130073 A | 7/2015 |
| JP | 2018-092402 A | 6/2018 |
| WO | 02/093835 A1 | 11/2002 |

OTHER PUBLICATIONS

Line Corporation, Feb. 19, 2009, http;//directorblog.jp/archives/51170061.html.

Notice of Reasons for Refusal dated Dec. 4, 2018, of counterpart Japanese Application No. 2017-224981, along with an English translation.

Extended European Search Report dated Jul. 13, 2020, for counterpart European Application No. 18 880 928.9.

Office Action dated Mar. 31, 2021, for counterpart European Application No. 18 880 928.9.

\* cited by examiner

| CUSTOMER ID = PC001 | | |
|---|---|---|
| USING API = BIOMETRICS AUTHENTICATION API, PLAN 1 | | |
| DATE | NUMBER OF REQUEST | |
| 2017/12/01 | 200req | |
| 2017/12/02 | 130req | |
| ... | ... | |

| CUSTOMER ID = PC001 | |
|---|---|
| USING API = IoTAPI, PLAN 10 | |
| DATE | DATA AMOUNT |
| 2017/12/01 | 200req |
| 2017/12/02 | 130req |
| ... | ... |

FIG. 8

| TYPE | NOTIFICATION CONDITION | DISTRIBUTION TARGET | DISTRIBUTION NOTIFICATION MEANS |
|---|---|---|---|
| 1. ADVANCE NOTIFICATION OF EXCEEDING FREE OF CHARGE RANGE | WHEN 90% OF FREE OF CHARGE RANGE OF CHARGING PLAN IS EXCEEDED | Admin / Billing | NOTIFICATION MAIL |
| 2. NOTIFICATION OF EXCEEDING FREE OF CHARGE RANGE | WHEN FREE OF CHARGE RANGE OF CHARGING PLAN IS EXCEEDED | Admin / Billing | NOTIFICATION MAIL |
| 3. ADVANCE NOTIFICATION OF EXCEEDING DATA AMOUNT | WHEN 90% OF RANGE OF CHARGING PLAN IS EXCEEDED *UNIFORMLY FIXED | Admin / Billing | NOTIFICATION MAIL |
| 4. NOTIFICATION OF EXCEEDING DATA AMOUNT | WHEN DATA AMOUNT OF CHARGING PLAN IS EXCEEDED | Admin / Billing | NOTIFICATION MAIL |
| 5. NOTIFICATION OF EXCEEDING TOTAL CHARGE | WHEN CHARGE FOR THIS MONTH EXCEEDS UNIT OF CHARGE, REQUESTS AND DATA AMOUNT SPECIFIED BY USER | Admin / Billing | NOTIFICATION MAIL |
| 6. NOTIFICATION OF EXCEEDING CHARGE PER APP | WHEN CHARGE FOR THIS MONTH PER APP EXCEEDS UNIT OF CHARGE, REQUESTS AND DATA AMOUNT SPECIFIED BY USER | Admin / Billing | NOTIFICATION MAIL |

FIG. 9

API CHARGING SYSTEM, API CHARGING MANAGEMENT METHOD, AND API CHARGING PROGRAM

TECHNICAL FIELD

This disclosure relates to an application program interface API charging system, an API charging management method, and an API charging program for an application using an API.

BACKGROUND

A mechanism that allows a developed application to be used by other applications via an API has been spreading in recent years. The application provider generally charges the user of the application according to the use of the application. For example, Japanese Laid-Open Patent Publication No. 2009-116865 discloses a Web API that contributes to generation of a web site with an advertisement is specified, and an advertisement providing system capable of distributing an advertisement introduction charge distributes a total amount of charges to Web API providers according to the number of times the Web API is used.

However, in the charging method disclosed in JP2009-116865A, the fee for the use of a certain API is determined according to the number of times of use of the API, and if the number of times of use is the same, the same fee is charged independently of the type of the user of the application. That is, the fee for use is not flexibly determined according to the user of the application. In contrast, a demand that the API provider wishes to change the charging amount according to what application the user uses for the application to be provided has been spread.

Accordingly, it could be helpful to provide an API charging system, an API charging management method, and an API charging program capable of flexibly changing the charging amount according to the user even for the same API.

SUMMARY

We thus provide:

An API charging system includes at least an API management device that manages APIs for each of a plurality of platforms, and a charging management device that manages charging for an application that uses the APIs. The API management device includes: a reception unit configured to receive selection of a charging condition when using an API from the application; a receiver configured to receive a request for the API from the application; a transmitter configured to transmit a response according to the request to the application; and a history storage configured to store a history of the request for the API and the response for each of the applications that use the API. The charging management device includes: a charging condition storage configured to store the charging condition received by the reception unit for each of the applications that use the API when using the API; an acquisition unit configured to acquire information on the history from the history storage; and a determination unit configured to determine a charge value for the application that uses the API based on the charging condition and the information on the history. The determination unit determines a different charge value according to the charging condition for at least two of the applications that use the API and have the same history.

The charging condition storage may store a presence/absence of charging according to a success/failure of the request as the charging condition, the transmitter may transmit the response to the application by an HTTP status code, and the determination unit may determine the success/failure of the request according to the HTTP status code to determine the charge value.

The charging condition storage may store the charge value as the charging condition according to at least one of a data amount of the request and a data amount of the response for each of the applications that use the API, and the determination unit may determine the charge value according to at least one of (1) the data amount of the request and the data amount of the response, (2) the data amount of the request, and (3) the data amount of the response.

The determination unit may determine the charge value according to a data amount related to a message body among packet data of the request and the response.

The charging condition storage may store a different charging condition for each client that provides the application that uses the API.

The API charging management method is directed to an API charging management method in an API charging system including at least an API management device that manages APIs for each of a plurality of platforms and a charging management device that manages charging for an application that uses the APIs. The API management device is configured to perform: a reception step of receiving a selection of a charging condition when using an API from the application; a receiving step of receiving a request for the API from the application; a transmission step of transmitting a response according to the request to the application; and a history storage step of storing a history of the request for the API and the response for each of the applications that use the API. The charging management device is configured to perform: a charging condition storage step of storing the charging condition received in the reception step for each of the applications that use the API when using the API; an acquisition step of acquiring information on the history stored in the history storage step; and a determination step of determining a charge value for the application that uses the API based on the charging condition and the information on the history. The determination step determines a different charge value according to the charging condition for at least two of the applications that use the API and have the same history.

An API charging program is executed by an API management device that manages APIs for each of a plurality of platforms and a charging management device that manages charging for an application using the APIs. The API management device and the charging management device are included in an API charging system. The API charging program causes the API management device to perform: a reception function of receiving a selection of a charging condition when using an API from the application; a receiving function of receiving a request for the API from the application; a transmission function of transmitting a response according to the request to the application; and a history storage step of storing a history of the request for the API and the response for each of the applications that use the API. The API charging program causes the charging management device to perform: a charging condition storage function of storing the charging condition received by the reception function for each of the applications that use the API when using the API; an acquisition function of acquiring information on the history stored by the history storage function; and a determination function of determining a charge value for the application that uses the API based on the charging condition and the information on the history. The determination function determines a different charge value according to the charging condition for at least two of the applications that use the API and have the same history.

We provide an API charging system, an API charging management method, and an API charging program for flexibly changing the charging amount according to the user even for the same API.

BRIEF DESCRIPTION OF THE DRAWINGS

FIG. 8 is a diagram illustrating an example of API usage history tables according to an example.

FIG. 9 is an explanatory view of alert types according to an example.

REFERENCE NUMBERS

Figure 1:
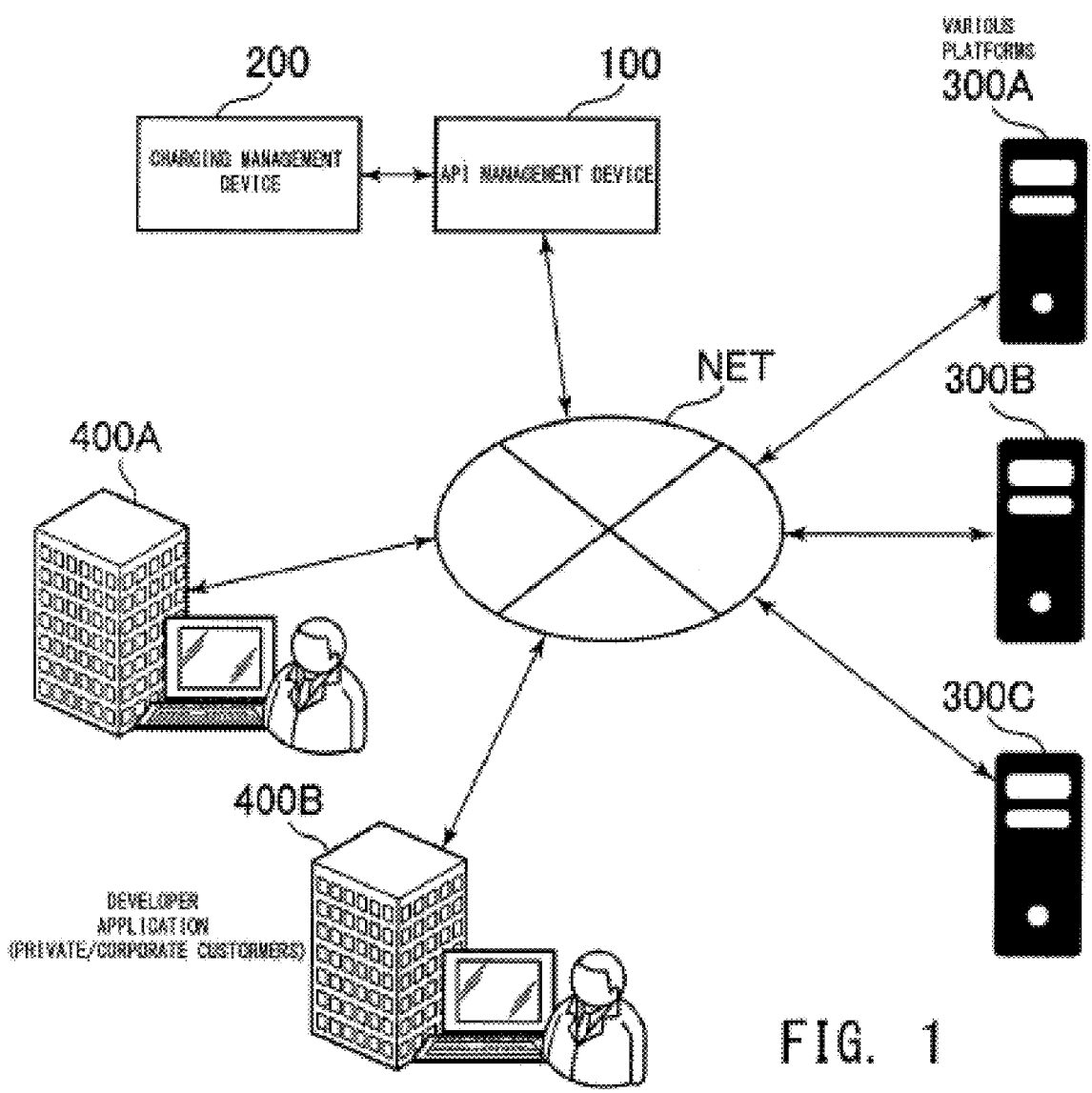
FIG. 1 is a schematic diagram of a configuration of an API charging system according to an example.

500: charging system
100: API management device
200: charging management device
300A, 300B, 300C: platforms
400A, 400B: developer applications (customers)
110: controller
120: portion
130: storage
111: transmitter/receiver
112: API receiver
113: API transmitter
114: reception unit
115: determination unit
116: analyzer
117: alert generator
10: request
11: response
131: application information storage
132: history storage
210: controller
230: storage
211: acquisition unit
212: transmitter/receiver
231: charging condition storage
232: alert condition storage

DETAILED DESCRIPTION

Hereinafter, an example will be described in de-tail with reference to the drawings. FIG. 1 is a schematic diagram of a configuration of an API charging system according to the example. As shown in FIG. 1, an API charging system 500 includes at least an API management device 100, a charging management device 200, a plurality of various platforms 300A, 300B, and 300C, and private or corporate customers (developer applications) 400A and 400B. The platforms 300A to 300C are directed to platforms for existing applications provided by the API provider. The API management device 100 manages the APIs for each of the plurality of platforms 300A to 300C. That is, the API management device 100 is directed to a gateway system for collecting and centrally managing APIs to access resources such as systems or information owned by providers of the existing applications. The API management device 100 is connected to the various platforms 300A, 300B, and 300C via the network NET to be able to communicate with each other. The network NET is directed to, for example, a wireless network or a wired network. Specifically, the network NET includes a wired LAN, a wireless LAN (WLAN), a wide area network (WAN), integrated service digital networks (IS-DNs), wireless LANs, long term evolution (LTE), LTE-Advanced, the fourth generation (4G), the fifth generation (5G), and a code division multiple access (CDMA), for example. In addition, although FIG. 1 shows an API management device 100, the device 100 may include a greater number of server groups or alone.

The developer applications 400A and 400B are directed to customer applications that use existing applications provided by the API provider. The API management device 100 performs management such as management of customer information and usage application of the existing applications from the developer applications 400A and 400B. Although FIG. 1 shows three or four of the platforms 300A to 300C and developer applications 400A and 400B, more than three or four of them may be provided. In addition, hereinafter, they are collectively referred to as the platform 300 and the developer application 400 unless they need to be distinguished from each other.

The charging management device 200 manages charging for the developer application 400 that uses the API. The API management device 100 and the charging management device 200 may be connected via the network NET and exchange information on charging, for example. Alternatively, they may be connected via an in-house LAN or a dedicated LAN network.

Figure 2:
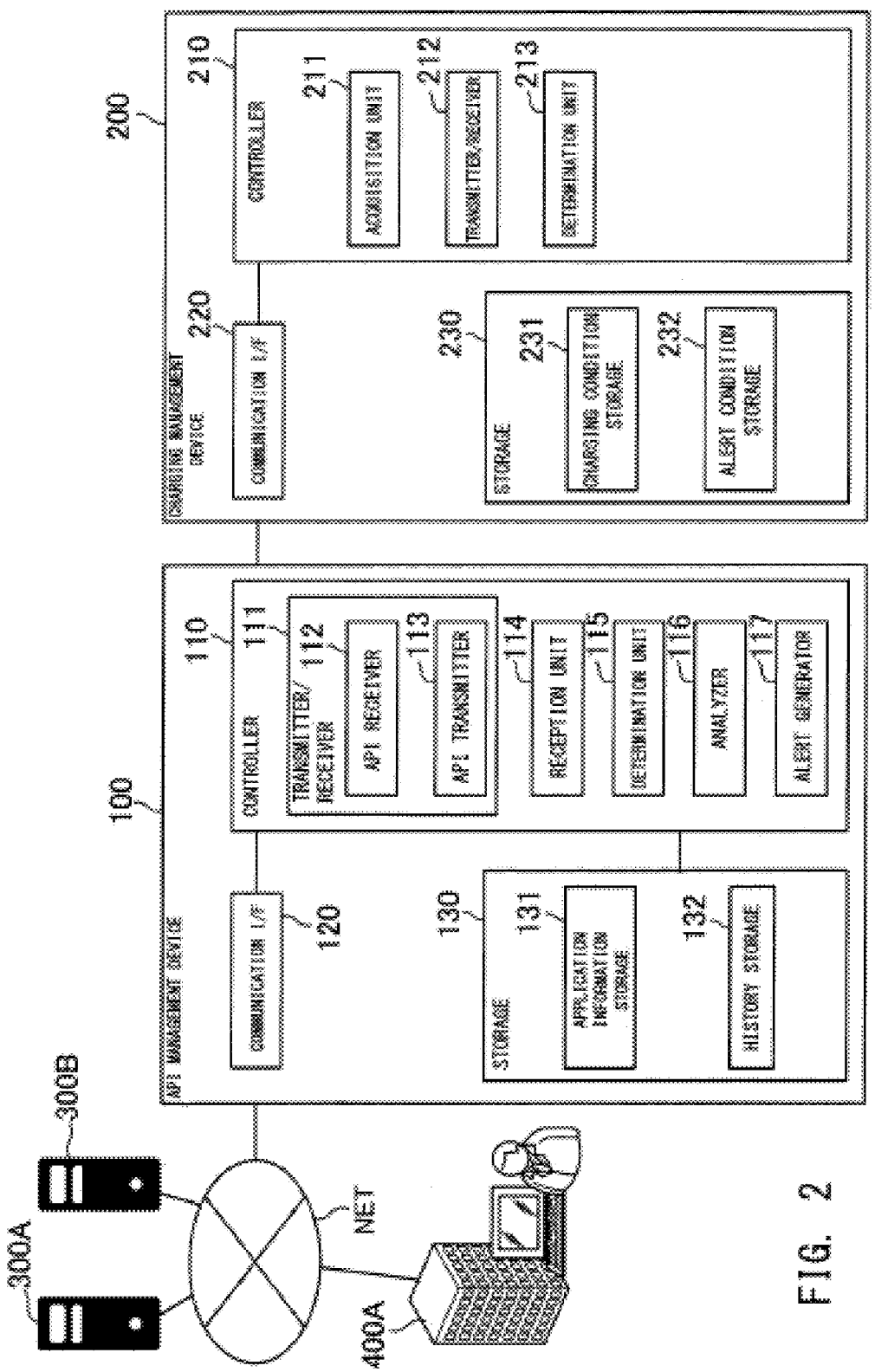
FIG. 2 is an example of a block diagram of an API management device and a charging management device according to an example.

FIG. 2 is a block diagram of the API management device 100 and the charging management device 200 according to an example. First, the API management device 100 will be described.

As shown in FIG. 2, the API management device 100 includes a controller 110, a communication interface I/F 120, and a storage 130. The controller 110 is directed to a processor having a function of controlling each unit of the API management device 100. The controller 110 includes at least a transmitter/receiver 111, an API receiver 112, an API transmitter 113, a reception unit 114, a determination unit 115, an analyzer 116, and an alert generator 117.

The transmitter/receiver 111 controls transmission/reception (exchange) of various types of information between the API management device 100 and external devices such as the developer application 400 and the platform 300 via the communication I/F 120. For example, the transmitter/receiver 111 receives selection of charging conditions from the developer application 400 when the developer application 400 uses an API. A plurality of types of charging conditions are set for an API, and a different charging condition is set for each developer application 400 (application user). This will be described with reference to FIG. 5.

Figure 5:
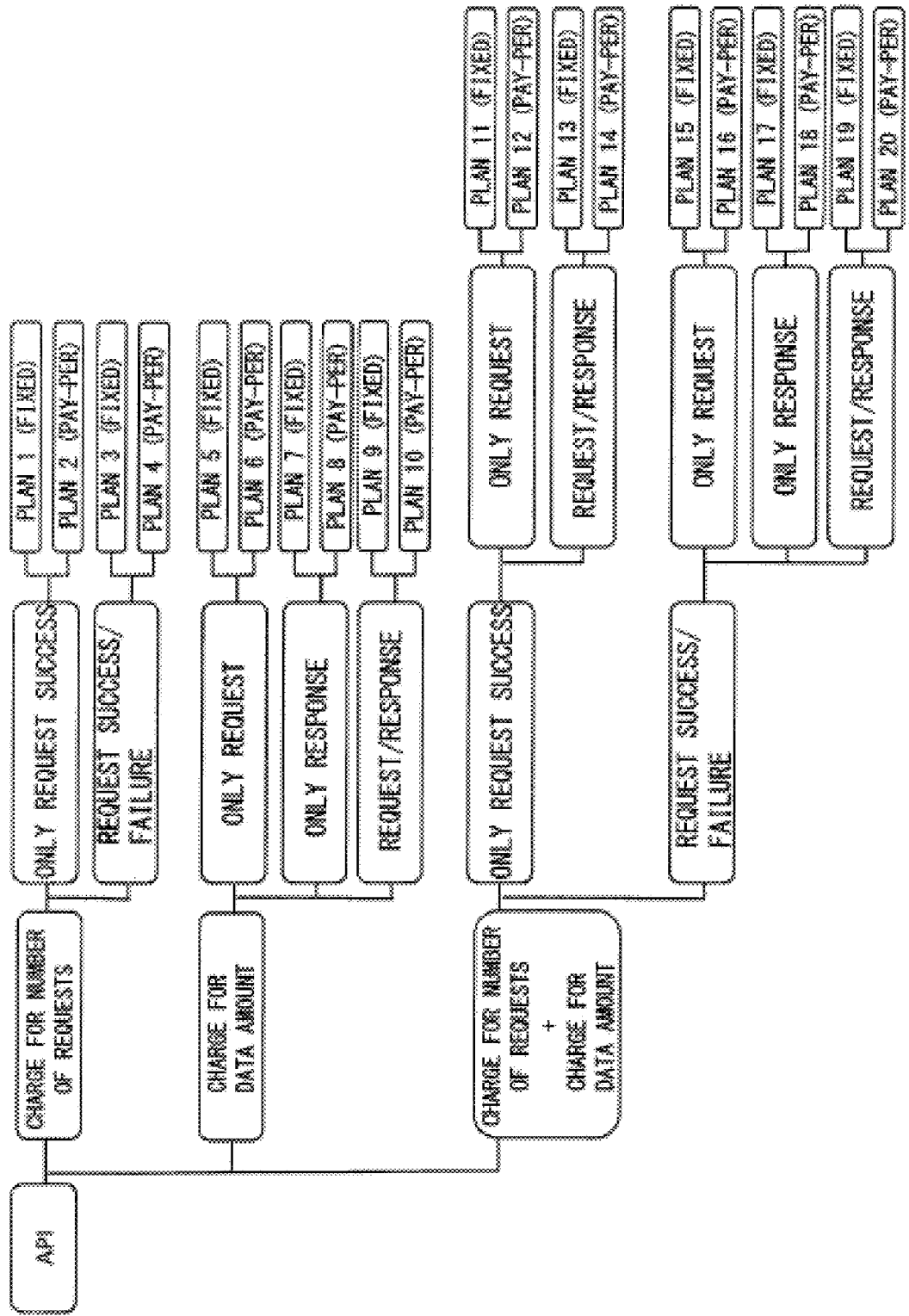
FIG. 5 is an explanatory view of types of charging plans according to an example.

As shown in FIG. 5, for a certain API, the charging conditions are roughly divided into "charge for number of requests," "charge for data amount," and a combination of "charge for number of requests+charge for data amount." The "charge for number of requests" is directed to a condition for charging according to the number of API usage requests. The "charge for data amount" is directed to a condition for charging according to the data amount in the API usage request and the response to the request. In addition, the "charge for number of requests+charge for data amount" is directed to a combination thereof. The "charge for number of requests" is classified into the "only request success" and "request success/failure." The "only request success" is directed to a condition for charging only when the API usage request is successful. That is, the charging is not performed when the request fails. In contrast, the "request success/failure" is directed to a condition for charging independent of the success or failure of the API request. The "charge for number of requests+charge for data amount" is directed to a combination of them. In each condition, it is possible to select whether the charge collection is "fixed charge" or "pay-per." The reception unit 114 of the API management device 100 accepts selection of charging conditions from the developer application 400 as well as an application for using an existing application.

Figure 3:
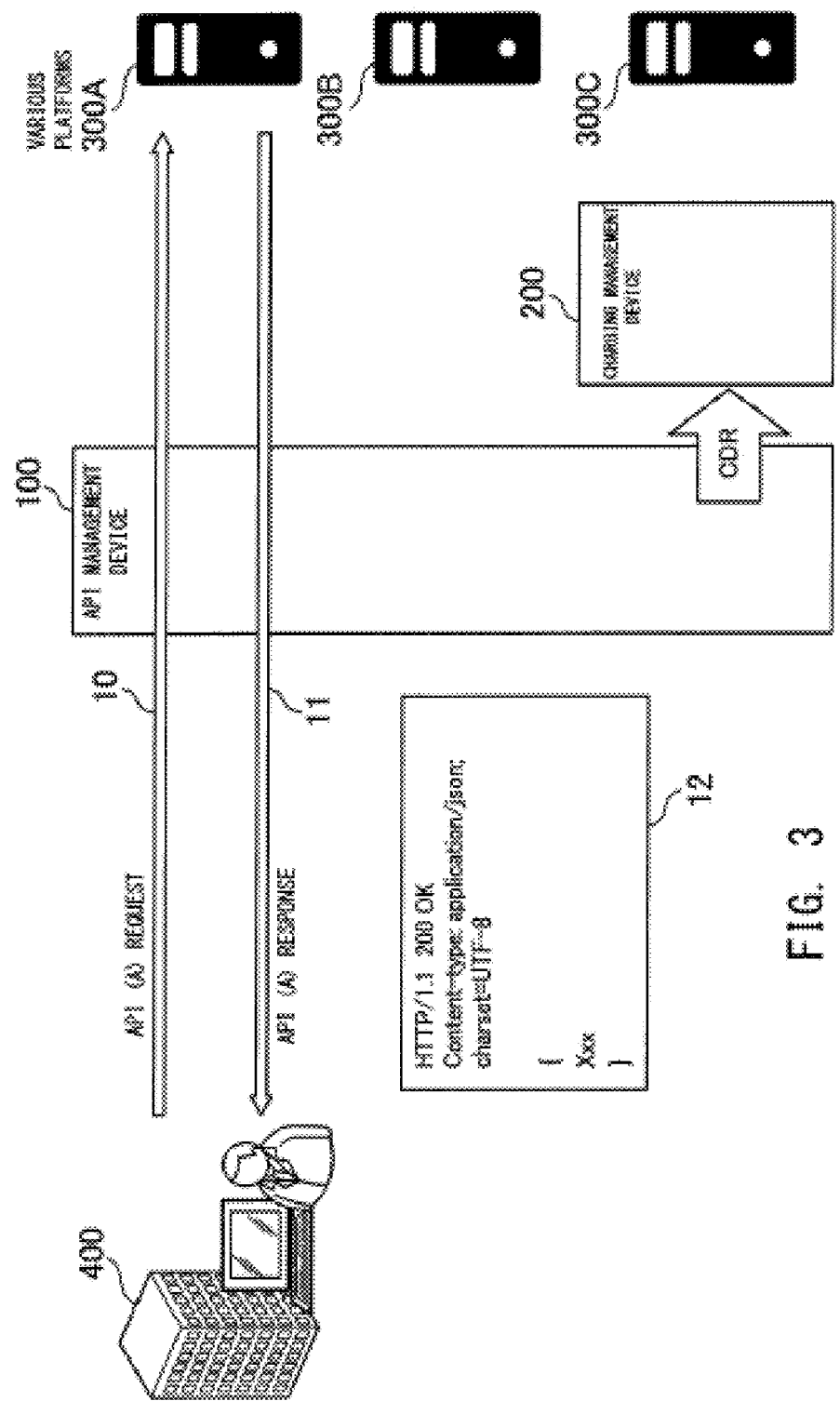
FIG. 3 is an explanatory view of an API request/response according to an example.
Figure 4:
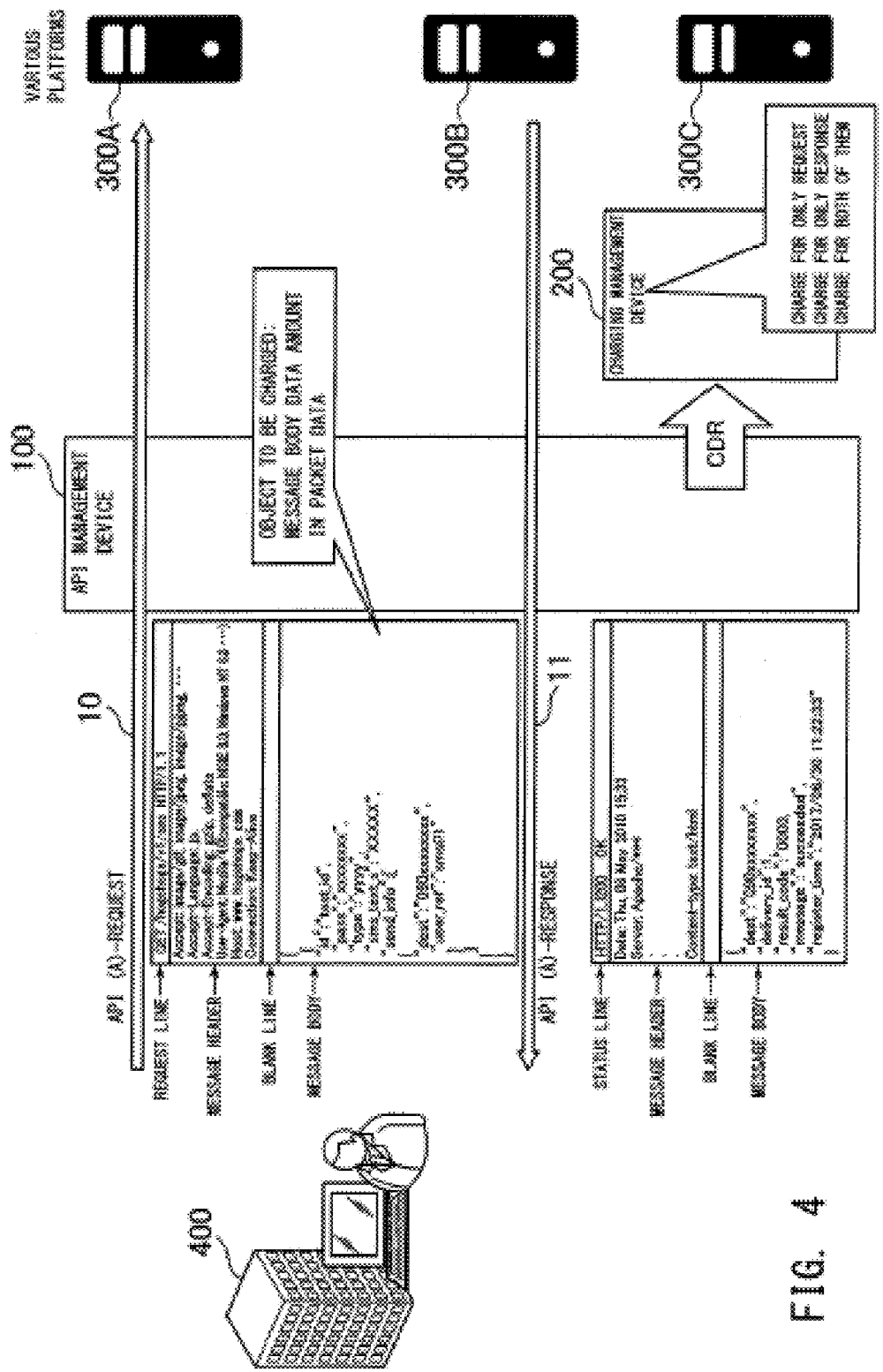
FIG. 4 is an explanatory view of an API request/response according to an example.

The API request/response will be described with reference to FIG. 3. The API receiver 112 receives a request for an API from the developer application 400. As shown in FIG. 3, the API request 10 is transmitted from the developer application 400 to the API management device 100. The API transmitter 113 of the API management device 100 transmits the API request to the platform 300 according to the contents of the API request. The API transmitter 113 then transmits the API response 11 transmitted from the platform 300 to the developer application 400. The API request 10 and the API response 11 are transmitted in HTTP format. The analyzer 116 of the API management device 100 analyzes the API response and determines success/failure of the request. For example, if the status code of the response 11 is in the "200" range, the analyzer 116 determines that the request has been successful. If the status code of the response 11 is in the "400" range, the analyzer 116 determines that the request has failed.

Further, the analyzer 116 analyzes the contents of the API request 10 and the API response 11, and obtains the data amount in the message body of the packet data. When charging is performed according to the data amount, the data amount of only the main body portion of the message body may be set as an object to be charged, and the data amount of the header portion need not be set as an object to be charged. This provides a service more in line with the customer's request. The determination unit 115 of the API management device 100 performs various determination processes. The data amount analyzed by the analyzer 116 and information on the success or failure of the request are transmitted to the charging management device 200 by the transmitter/receiver 111.

The storage 130 typically includes various recording media such as a hard disc drive (HDD), a solid state drive (SSD), and a flash memory, which has a function of storing (recording) various programs and data needed for the API management device 100 to operate. The storage 130 includes at least an application information storage 131 and a history storage 132. The application information storage 131 stores information on existing applications used by the developer application 400. The history storage 132 stores history information when the developer application 400 uses the existing applications via the API. That is, the history storage 132 stores a history of requests and responses to the API for each of a plurality of applications that use the API.

The determination unit 115 performs various determination processes. Further, the alert generator 117 generates a predetermined alert according to the API usage frequency of the developer application 400 (details will be described below).

Next, the charging management device 200 will be described. The charging management device 200 includes at least a controller 210, a communication interface I/F 220, and a storage 230. The controller 210 is directed to a processor having a function of controlling each unit of the charging management device 200, and includes at least an acquisition unit 211, a transmitter/receiver 212, and a determination unit 213. The acquisition unit 211 acquires information on the history of API requests and responses from the history storage 132 of the API management device 100. The transmitter/receiver 212 controls data exchange between the charging management device 200 and an external device such as the API management device 100 via the communication I/F 220. The determination unit 213 determines a charge value for an application that uses the API on the basis of the information on the charging conditions and history.

Figure 7:
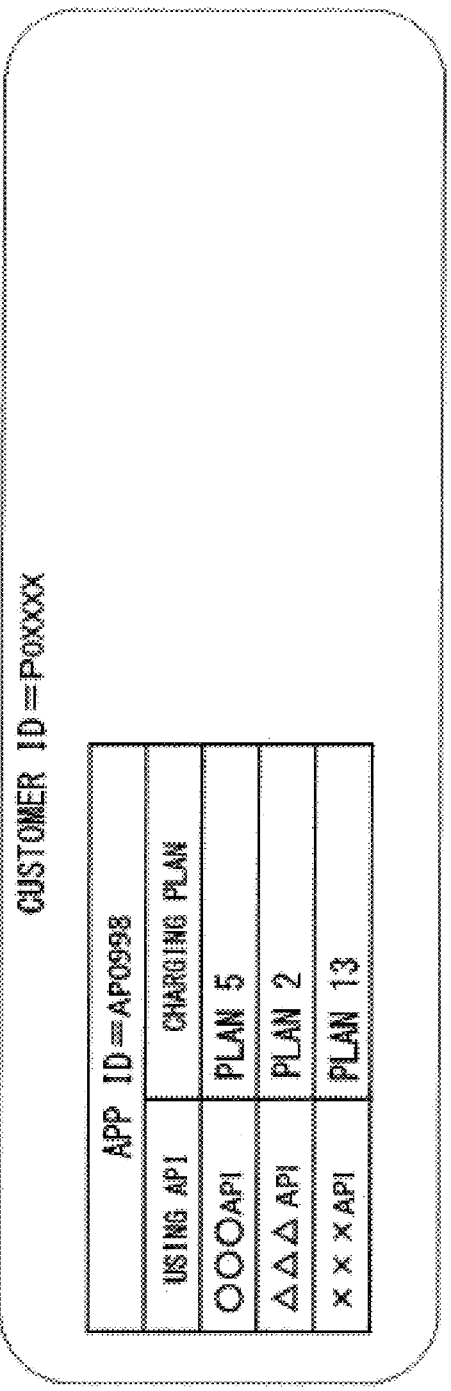
FIG. 7 is a diagram illustrating an example of charging condition tables according to an example.

The storage 230 typically includes various recording media such as a hard disc drive (HDD), a solid state drive (SSD), and a flash memory having a function of stor-ing (recording) various programs and data needed for the charging management device 200 to operate. The storage 230 includes at least a charging condition storage 231 and an alert condi-tion storage 232. The charging condition storage 231 stores a charging condition for using the API received by the reception unit 114 of the API management device 100 for each of a plurality of developer applications that use the API. The types of charging conditions are as described above with reference to FIG. 5. A charging condition table stored in the charging condition storage 231 will be described with reference to FIG. 7. As shown in FIG. 7, the APIs to be used and the charging plans are stored in association with each other for each of the developer applications. The pieces of information may be collected for each customer. FIG. 8 shows an example of history information stored in the history information storage. As shown in FIG. 8, the number of requests and the data amount are stored for each plan of the API to be used.

Figure 6:
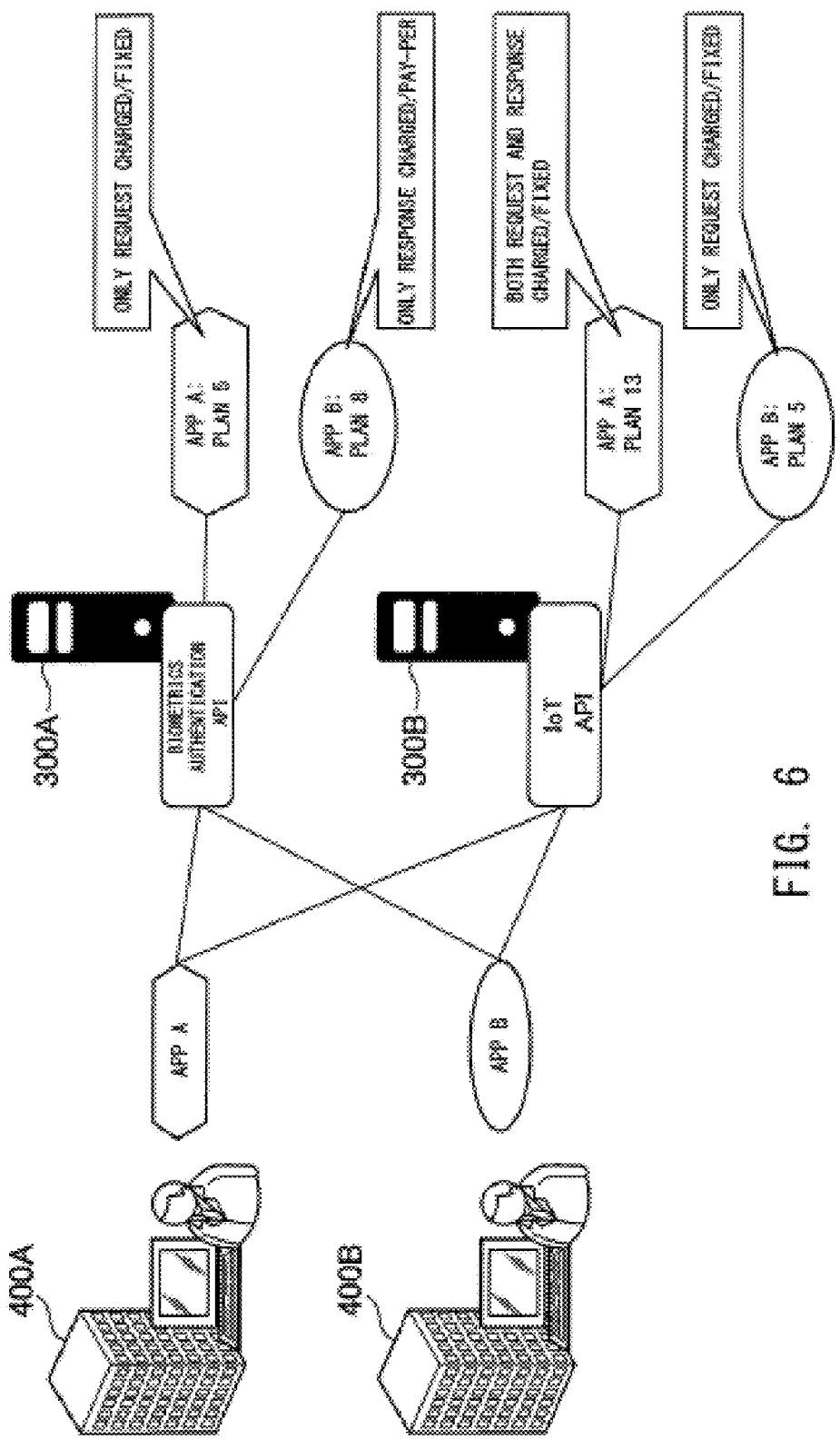
FIG. 6 is an explanatory view of an overview of an API charging system according to an example.

An example in which the charging condition is flexibly set by the developer application will be schematically described with reference to FIG. 6. The "plans" in FIG. 6 correspond to those in FIG. 5. As shown in FIG. 6, it is assumed that a customer 400A is developing an application A (app A) and a customer 400B is developing an application B (app B). Both the app A and the app B use "biometric authentication API" and "IoTAPI" as existing applications. The app A uses a biometric authentication API with "plan 5," and the app B uses the biometric authentication API with "plan 8." The app A uses IoTAPI with "plan 13," and the app B uses the IoTAPI with "plan 5."

As described above, even with the same API, different charging conditions can be set according to the user's application. This allows the API provider to widen the range in which the existing applications are used and perform efficient charging. Although the description above illustrates an example of setting the charging conditions for different plans for each of the user applications, the charging conditions may be set for each of the customers. That is, for the same customer, a single application (for example, "biometrics authentication API") may be set to allow only a single plan to be used. This allows the charging management to be performed more easily.

A predetermined alert may be transmitted to the developer application according to the charging conditions. FIG. 9 shows an example of alert conditions stored in the alert condition storage 232 of the charging management device 200. Since the charging is performed for each app, as shown in type 6 in FIG. 9, an alert may be set to be transmitted when the charge exceeds the limit for each app. The alert may be transmitted by e-mail, or may be displayed on the management screen for each customer.

Figure 10:
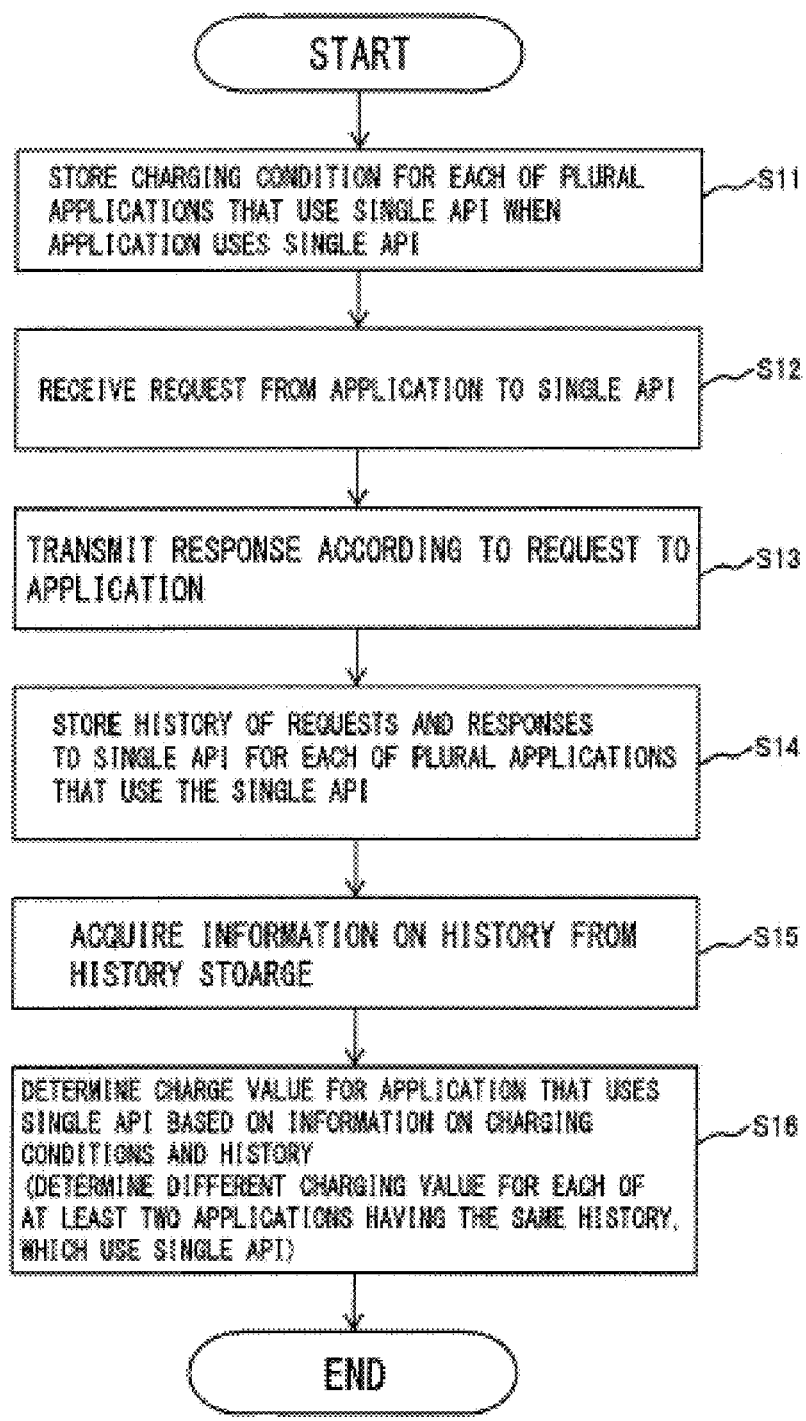
FIG. 10 is an example of a flowchart of an API charging management method according to an example.

Next, an API charging management method by the API management device 100 described above will be described with reference to the drawings. FIG. 10 is a flowchart of the API charging management method by the API management device 100. First, the storage 130 stores a charging condition for using an API for each of a plurality of applications that use the API (step S11). Specifically, the charging condition table shown in FIG. 7 is stored. Next, the API receiver 112 receives a request from the developer application to the API (step S12). The API transmitter 113 transmits a response according to the request to the developer application (step S13). The history storage 132 stores a history of the requests and responses to the API for each of the applications that use the API (step S14). The acquisition unit 211 acquires information on the history from the history storage 132 (step S15). The determination unit 213 determines a charge value for the application that uses the API on the basis of the information on the charging conditions and history. At that time, even if the history information is the same (for example, even if the number of requests is the same) among the applications that use the API, the charge value varies as long as the charging conditions are different (i.e., depending on the charging according to the amount of data, and the charging according to the number of requests, for example) (step S16).

Figure 11:
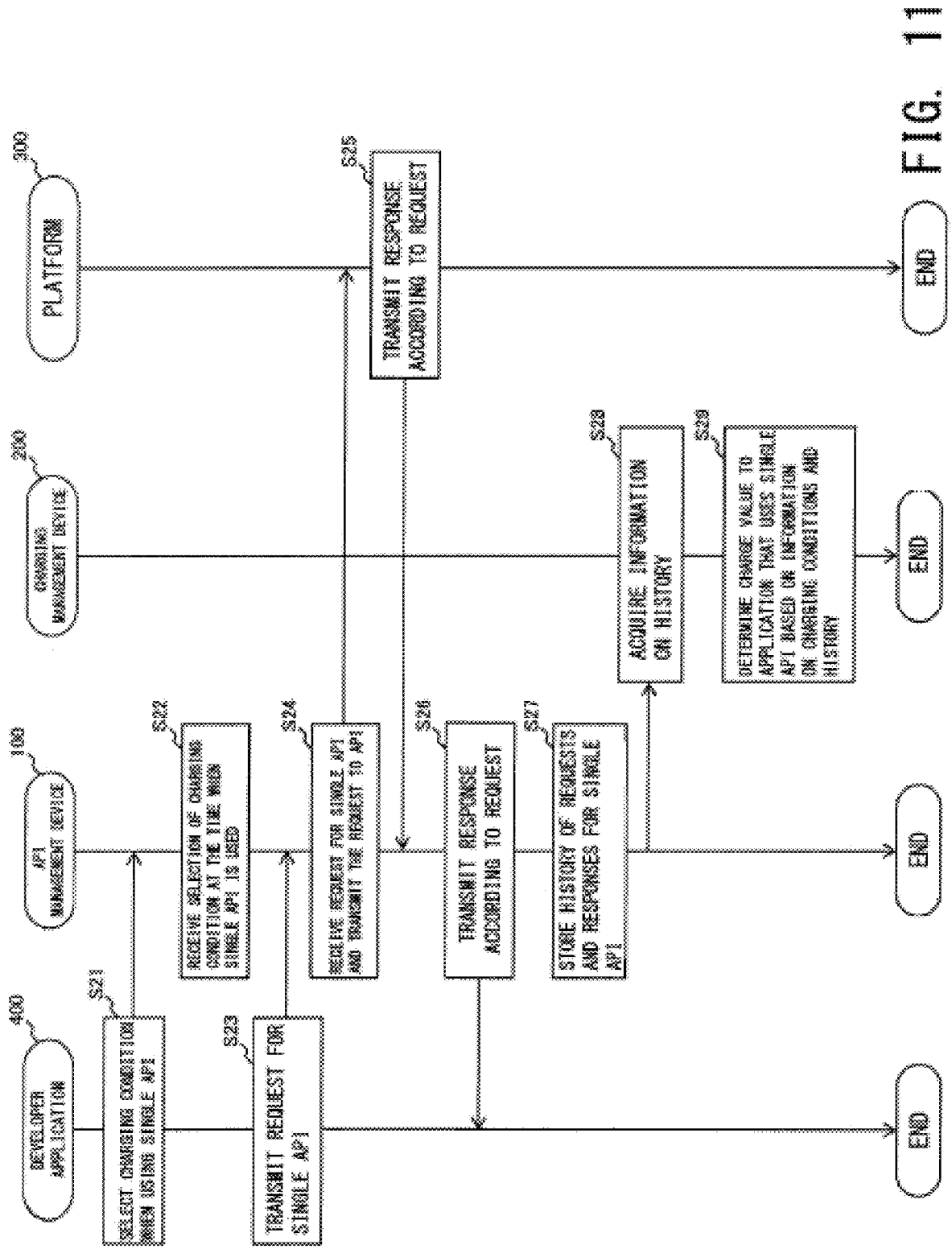
FIG. 11 is an example of a sequence diagram of an API charging system according to an example.

Next, the API management processes by the API management device 100, the charging management device 200, the platform 300, and the developer application 400 will be described. FIG. 11 is a sequence diagram illustrating a flow of an API management process by the API management device 100, the charging management device 200, the platform 300, and the developer application 400 according to an example.

The developer application 400 transmits a selection of a charging condition when the API is used (step S21). The reception unit 114 of the API management device 100 receives the selection of the charging condition (step S22), and the developer application 400 transmits a usage request for the API (step S23). The API management device 100 transmits the request to the platform 300 (step S24). The platform 300 transmits a response according to the request (step S25). The API management device 100 transmits the response to the developer application (step S26). Thereafter, the history storage 132 stores a history of requests and responses for the API (step S27). The charging management device 200 acquires information on the history (step S28). The charging management deice 200 then determines a charge value for the application that uses the API on the basis of the information on the charging condition and history (step S29).

As described above, the API provider may set different charging conditions for each user application even with the same API. Therefore, the API is allowed to be flexibly provided according to the contents of the user application. For example, if the existing application is intended to provide data, the application that extracts more data may be charged according to the amount of data, and the other applications may be charged according to the number of requests. Further, the charging condition may vary according to the contents of the existing application. For example, if the user application acquires data from a predetermined database, the request may not be charged, and the response (data acquisition) may be charged. This satisfies the needs of the user for acquiring data.

Although our systems, methods and programs have been described on the basis of the drawings and examples, those skilled in the art may easily make various variations and modifications based on this disclosure. Therefore, the variations and modifications are included in the scope of the disclosure. For example, functions included in means and steps may be rearranged without being logically inconsistent with each other, and the means and steps may be combined to be integrated or divided into a plurality of means and steps. The configurations described in the examples above may be combined as appropriate. For example, the functions described separately as the API management device 100 or the charging management device 200 may be performed by the API management device 100 only. Each component described as being included in the API management device 100 may include being distributed to a plurality of information processing apparatuses.

Moreover, although an example has been described, this disclosure is not restricted to this. For example, in the above description, various types of information described as being stored in the storage 130 of the API management device 100 and the storage 230 of the charging management device 200 may be stored in an external memory different from the API management device 100 or on the cloud, otherwise may be integrated into the storage of one of them. The tables illustrated in FIGS. 7 and 8 are examples only, and thus the stored information is not limited to the illustrated ones.

In the above description, the charging conditions shown in FIG. 5 have been described for each application. However, depending on the application, the charging may be performed for only the amount of data or only the number of requests. In addition, the basic value for charging (basic charge, charge value per request, for example) may be the same for each application, or may differ according to the customer.

The charge value may be calculated each time, and information on the charge value may be passed to the API management device 100. The API management device 100 controls the current charge value information to allow the customer to view the charge value information with text and graphs, for example, when a request for viewing the charge value is received from the customer. For example, if the daily charge value includes a value after the decimal point, the daily charge value does not include the value after the decimal point to allow the customer to view the value. For example, when the charge values are collected for a predetermined period every month, the charge value including the cumulative value after the decimal point may be calculated.

Further, the network NET is not limited to the examples described above. For example, the public switched telephone network (PSTN), Bluetooth (registered trademark), an optical line, an asymmetric digital subscriber line (ADSL), satellite communication may be employed, and any network may be used. Also, the network NET may be a combination of them.

Although the above description illustrates an example in which the charging condition is set according to the selection of the customer, the controller 110 may set an appropriate charging condition according to the contents of the customer application. For example, the charging may be set according to the customer information (such as scale and developed application) using artificial intelligence (AI). The charging conditions may be changed.

Each functional unit of the API management device 100 may be embodied by a logic circuit (hardware) and a dedicated circuit formed in an integrated circuit (IC) chip and a large scale integration (LSI), for example, or may be embodied by software using a central processing unit (CPU). Also, each functional unit may be embodied by one or more integrated circuits, and the functions of a plurality of the functional units may be embodied by a single integrated circuit. In addition, the API management device 100 described above may be embodied by a plurality of server computers, or by calling an external platform by the API, for example, depending on the function.

When each functional unit of the API management device 100 is embodied by software, the API management device 100 or the charging management device 200 includes a CPU that executes instructions of a program as software that embodies each function, a read only memory (ROM) or a storage (hereinafter, referred to as "recording medium") that stores the program above and various data allowed to be read by a computer (or the CPU), and a random access memory (RAM) that develops the program, for example. It is advantageous when a computer (or CPU) reads and runs the program from the recording medium. That is, the API management device 100 allows the CPU to run the program loaded on the RAM to serve as the transmitter/receiver 111, the API receiver 112, the API transmitter 113, the reception unit 114, the determination unit 115, the analyzer 116, and the alert generator 117. As the recording medium, a "non-temporary tangible medium" such as a semiconductor memory and a programmable logic circuit may be used. In addition, the program may be supplied to the computer via an optional transmission medium (such as a communication network and a broadcast wave) capable of transmitting the program. We also provide for a data signal embedded in a carrier wave in which the program is to be embodied by electronic transmission.

The programs above may be implemented by using script languages such as ActionScript, JavaScript (registered trademark), Python, and Ruby, object-oriented programming languages such as C language, C++, C#, Objective-C, Swift, and Java (registered trademark), and a markup language such as HTML5, for example. In addition, the description of "portion (section, module, and unit)" in the claims may be read as "means" or "circuit." For example, the receiver may be read as receiving unit or a receiving circuit.

What is claimed is:

1. A system for managing access to an application programming interface (API), the system comprising:
    an API manager connected via a network to a plurality of platforms and manages one or more APIs for each of the plurality of platforms, the API manager configured to:
        present, via a transceiver, one or more usage conditions for accessing the one or more APIs to one or more developer applications, wherein each usage condition for each API is: different for a single developer application, flexibly set for each developer application, and determined by either data usage or a number of requests when two developer applications share a same history,
        receive, via the transceiver, a request to use the API and a selection of a usage condition for the API from a first developer application,
        transmit, via the transceiver a response to the first developer application, and
        store, in a history storage, history information associated with the first developer application, the history information comprising one or more of an amount of data usage, the request, and the response; and
    a charging manager connected to the API manager, the charging manager configured to:
        store, in a usage condition storage, the usage condition,
        acquire, via an acquirer, the history information from the history storage, and
        determine, via a determiner, a value associated with the developer application's use of the API based on the usage condition and the history information;
    the API manager further configured to present, via the transceiver, the value to the first developer application.

2. The system of claim 1, wherein the usage condition comprises a success/failure of the request to use the API as determined by an HTTP status code of the response.

3. The system according to claim 2, wherein the usage condition comprises a success/failure of the request to use the API as determined by an HTTP status code of the response.

4. The system according to claim 2, further comprising:
    storing, in the usage condition storage, a different usage condition for each of the one or more developer applications.

5. The system according to claim 2, further comprising:
    setting, by the API manager, the one or more usage conditions according to a content of the one or more developer applications.

6. The system of claim 1, wherein the usage condition comprises one or more of a data amount of the request and a data amount of the response.

7. The system of claim 6, wherein the determiner determines the value according to a data amount related to a message body among packet data of the request and the response.

8. The system according to claim 7, further comprising:
    storing, in the usage condition storage, a different charging condition for each of the one or more developer applications.

9. The API charging system according to claim 7, further comprising:
    transmitting, via the transceiver, a predetermined alert to the one or more developer applications based on the one or more usage conditions.

10. The system according to claim 7, further comprising:
    setting, by the API manager, the one or more usage conditions according to a content of the one or more developer applications.

11. The system according to claim 6, further comprising:
    storing, in the usage condition storage, a different charging condition for each of the one or more developer applications.

12. The system according to claim 6, further comprising:
    transmitting, via the transceiver, a predetermined alert to the one or more developer applications based on the one or more usage conditions.

13. The system according to claim 6, further comprising:
    setting, by the API manager, the one or more usage conditions according to a content of the one or more developer applications.

14. The system of claim 1, wherein the charging manager is further configured to store a different usage condition for each of the one or more developer applications.

15. The system according to claim 14, further comprising: transmitting, via the transceiver, a predetermined alert to the one or more developer applications based on the one or more usage conditions.

16. The system of claim 1, wherein the API manager is further configured to transmit, via the transceiver, a predetermined alert to the one or more developer applications based on the one or more usage conditions.

17. The system of claim 1, wherein the API manager is further configured to set the one or more usage conditions according to a content of the one or more developer applications.

18. A method for managing access to an application programming interface (API), the method comprising:

presenting, via a transceiver of an API manager connected via a network to a plurality of platforms and managing one or more APIs for each of the plurality of platforms, one or more usage conditions for accessing the one or more APIs to one or more developer applications, wherein each usage condition for each API is: different for a single developer application, flexibly set for each developer application, and determined by either data usage or a number of requests when two developer applications share a same history;

receiving, via the transceiver, a request to use the API and a selection of a usage condition for the API from a first developer application;

transmitting, via the transceiver, a response to the first developer application;

storing, in a history storage of the API manager, history information associated with the first developer application, the history information comprising one or more of an amount of data usage, the request, and the response;

storing, in a usage condition storage of a charging manager connected to the API manager, the usage condition;

acquiring, via an acquirer of the charging manger, the history information from the history storage;

determining, via a determiner of the charging member, a value associated with the developer application's use of the API based on the usage condition and the history information; and presenting, via the transceiver, the value to the first developer application.

19. The method according to claim 18, further comprising:

transmitting, via the transceiver, a predetermined alert to the one or more developer applications based on the one or more usage conditions.

20. The method of claim 18, wherein the usage condition comprises one or more of a data amount of the request and a data amount of the response.

21. A non-transitory computer readable medium with a program for managing access to an application programming interface (API) stored thereon, the program comprising instructions that, when executed by a processor, cause the processor to manage access to:

present, via a transceiver of an API manager connected via a network to a plurality of platforms and managing one or more APIs for each of the plurality of platforms, one or more usage conditions for accessing the one or more APIs to one or more developer applications, wherein each usage condition for each API is: different for a single developer application, flexibly set for each developer application, and determined by either data usage or a number of requests when two developer applications share a same history;

receive, via the transceiver, a request to use the API and a selection of a usage condition for the API from a first developer application;

transmit, via the transceiver, a response to the first developer application; and store, in a history storage of the API manager, history information associated with the first developer application, the history information comprising one more of an amount of data usage, the request, and the response;

store, in a usage condition storage of a charging manager connected to the API manager, the usage condition;

acquire, via an acquirer of the charging manager, the history information from the history storage;

determine, via a determiner of the charging member, a value associated with the developer application's use of the API based on the usage condition and the history information; and present, via the transceiver, the value to the first developer application.

* * * * *